(12) United States Patent
Hadjria et al.

(10) Patent No.: US 12,366,490 B2
(45) Date of Patent: Jul. 22, 2025

(54) METHOD AND DEVICE FOR PHYSICALLY MEASURING ENVIRONMENTAL AND OPERATIONAL CONDITIONS

(71) Applicant: SAFRAN, Paris (FR)

(72) Inventors: Rafik Hadjria, Moissy-Cramayel (FR); Oscar D'Almeida, Moissy-Cramayel (FR); Minh Chau Phan Huy, Moissy-Cramayel (FR); Nassim Salhi, Moissy-Cramayel (FR)

(73) Assignee: SAFRAN, Paris (FR)

( * ) Notice: Subject to any disclaimer, the term of this patent is extended or adjusted under 35 U.S.C. 154(b) by 355 days.

(21) Appl. No.: 18/003,168

(22) PCT Filed: Jun. 15, 2021

(86) PCT No.: PCT/FR2021/051077
§ 371 (c)(1),
(2) Date: Dec. 23, 2022

(87) PCT Pub. No.: WO2021/260294
PCT Pub. Date: Dec. 30, 2021

(65) Prior Publication Data
US 2023/0258514 A1  Aug. 17, 2023

(30) Foreign Application Priority Data
Jun. 25, 2020 (FR) ...................................... 2006669

(51) Int. Cl.
*G01K 11/3206* (2021.01)
*G01L 1/24* (2006.01)

(52) U.S. Cl.
CPC .......... *G01L 1/246* (2013.01); *G01K 11/3206* (2013.01)

(58) Field of Classification Search
CPC . G01L 1/246; G01K 11/3206; G01D 5/35316
See application file for complete search history.

(56) References Cited

U.S. PATENT DOCUMENTS 6,947,637 B2 * 9/2005 Smith ................ G01D 5/35312
  385/12
8,385,692 B2 * 2/2013 Homa ................ G02B 6/29319
  385/12

(Continued)

FOREIGN PATENT DOCUMENTS

| EP | 3066423 A1 | 9/2016 |
| EP | 3062078 B1 | 7/2019 |
| WO | 2015/067292 A1 | 5/2015 |

OTHER PUBLICATIONS

Qiang Li, Zhi Wang, Zejia Huang, Kaili Guo, and Lanlan Liu, "Implementation of blind source separation for optical fiber sensing," Appl. Opt. 53, 1832-1837 (2014).

(Continued)

*Primary Examiner* — David J Bolduc
(74) *Attorney, Agent, or Firm* — CHRISTENSEN O'CONNOR JOHNSON KINDNESS PLLC

(57) ABSTRACT

A method for measuring temperature and deformation of a part or structure on the basis of a single line of optical fiber having a single Bragg rating is provided. The method includes: interrogating the optical fiber based on two sampling frequencies; one being a low frequency and the other being a high frequency, said low frequency being suitable for sensing a slow rate of change corresponding to the temperature variation, and said high frequency being suitable for sensing a fast rate of change corresponding to vibrations; implementing an algorithmic block based on a blind-source-separation (BSS) technique, comprising a frequency analysis, a multivariate analysis and higher-order statistics; and returning to the time domain via an inverse Fourier transform.

8 Claims, 2 Drawing Sheets

(56) References Cited

U.S. PATENT DOCUMENTS

| | | | | |
|---|---|---|---|---|
| 2003/0072515 | A1* | 4/2003 | Ames | G01V 1/201 385/12 |
| 2003/0223688 | A1* | 12/2003 | Zhao | G02F 1/0115 385/10 |
| 2005/0274194 | A1* | 12/2005 | Skinner | E21B 47/135 73/736 |
| 2009/0177095 | A1* | 7/2009 | Aeby | A61B 1/00097 600/478 |
| 2010/0287906 | A1* | 11/2010 | Xia | G01K 11/3206 385/13 |
| 2011/0116743 | A1* | 5/2011 | Arkwright | G01L 9/0077 385/37 |
| 2014/0326078 | A1 | 11/2014 | Arkwright et al. | |
| 2014/0363126 | A1* | 12/2014 | Kat | G01D 5/35387 385/37 |
| 2015/0247826 | A1* | 9/2015 | Soejima | G01N 29/2418 73/643 |
| 2016/0116369 | A1* | 4/2016 | Barry | G01L 1/246 356/73.1 |
| 2016/0370206 | A1* | 12/2016 | Benier | G01D 5/35316 |
| 2019/0011491 | A1* | 1/2019 | Raghavan | G01J 3/1895 |
| 2020/0363241 | A1* | 11/2020 | Anderson | G01D 5/35316 |
| 2021/0123775 | A1* | 4/2021 | Kiesel | G01R 31/62 |
| 2021/0123797 | A1* | 4/2021 | Kiesel | G01H 9/004 |
| 2021/0190550 | A1* | 6/2021 | Handerek | G01D 5/35361 |
| 2021/0262835 | A1* | 8/2021 | Sternklar | G01D 5/35316 |

OTHER PUBLICATIONS

Mars Jerome I et al., "Source separation and distributed sensing: The key for an efficient monitoring", 2013 5th IEEE International Workshop on Computational Advances in Multi-Sensor Adaptive Processing (CAMSAP), IEEE,Dec. 15, 2013 (Dec. 15, 2013), p. 264-267.

English Translation of the International Search Report mailed on Sep. 8, 2021, issued in the corresponding International Application No. PCT/FR2021/051077, filed on Jun. 15, 2021, 2 pages.

English Translation of the Written opinion of the International Searching Authority mailed on Sep. 8, 2021, issued in the corresponding International Application No. PCT/FR2021/051077, filed on Jun. 15, 2021, 3 pages.

* cited by examiner

METHOD AND DEVICE FOR PHYSICALLY MEASURING ENVIRONMENTAL AND OPERATIONAL CONDITIONS

CROSS-REFERENCES TO RELATED APPLICATIONS

This application is a National Stage of International Application No. PCT/FR2021/051077 filed Jun. 15, 2021, which claims priority to French Patent Application No. 2006669, filed Jun. 25, 2020, the entire disclosures of which are hereby incorporated by reference.

TECHNICAL FIELD

The invention relates to the field of physical measurement of environmental and operational conditions, in particular in the field of monitoring the temperature and the deformation of parts such as aeronautical structural parts using optical fiber-based technology. The invention relates in particular to the simultaneous measurement of the temperature and the deformation of these parts.

PRIOR ART

It is known to perform temperature or deformation measurements by means of optical fiber devices and Bragg gratings. These measurements use either two lines of optical fiber bonded to the same structural area or part, each line comprising a Bragg grating. For these measurements, either the Bragg gratings are spatially close to each other so that this proximity allows the two Bragg gratings to experience the same temperature variation and the same deformation, or a fiber equipped with two Bragg gratings one to detect the temperature, the other the deformations but in this case, the Bragg gratings are distant from each other and do not measure the variations exactly at the same place.

In particular to measure physical quantities such as deformation and temperature via optical fiber technology based on Bragg gratings, it is traditionally planned to have two fiber lines. One possibility is to have a first fiber which has a Bragg grating attached to a host structure and is sensitive to deformation and temperature and a second fiber which has a Bragg grating not attached to the host structure. In the latter case, the second fiber can be slid into a capillary in turn attached to the host structure and sensitive to temperature. The two fibers each equipped with its grating allow to discriminate the effect of temperature and deformation at the first fiber.

In the case of a mesh M, one fiber will comprise a plurality M of Bragg gratings and will be sensitive to the deformation at the M points of the mesh while the other will comprise a plurality N of Bragg gratings and will be sensitive to the temperature at the N points of the mesh, M being able to be equal to N.

Another example of a device comprising two fibers each equipped with a grating is for example known from document US 2014326078 A1. In this document, the fibers are twisted and the gratings are disposed close to each other. In this case, the number of gratings is multiplied by two in the case of use for the mesh of a part.

Single fiber devices exist as described in "Implementation of blind source separation for optical fiber sensing" Qiang Li, Zhi Wang, Zejia Huang, Kaili Guo, and Lanlan Liu, Optical Society of America APPLIED OPTICS Vol. 53, No. 9, 20 Mar. 2014.

In said publication, source separation tools are defined in the time domain to discriminate temperature and deformation measurement using a single line of optical fiber having two inscribed Bragg gratings. However, the temperature and deformation measurements are not made at the same place and lose precision.

Technical Problem

It is desirable to reduce the number of fibers used in particular in complex structures to be monitored and to be able to use a single fiber combining temperature and deformation measurements at the same points without either increasing the number of Bragg gratings carried by the fiber in the case of a mesh.

DESCRIPTION OF THE INVENTION

In this context, the present application proposes a method for measuring localized temperature and deformation.

For this purpose, the present invention relates to a method for measuring temperature and deformation of a part or structure on the basis of a single line of optical fiber having a single Bragg grating, comprising the following steps:
- interrogating the optical fiber based on two sampling frequencies; one being a low frequency ($f_{sl}$) and the other being a high frequency ($f_{sh}$), said low frequency $f_{sl}$ being suitable for sensing a slow rate of change corresponding to the temperature variation, said high frequency $f_{sh}$ being suitable for sensing a fast rate of change corresponding to vibrations;
- Implementing an algorithmic block based on a blind-source-separation (BSS) technique, comprising a frequency analysis, a multivariate analysis, and higher-order statistics.

This method allows to use a single fiber and a single grating while performing the measurements at the same location for a simple measurement and to reduce the number of fibers and Bragg gratings while performing the measurements at the same locations when a part is in use/operation to obtain a temperature and deformation mapping of a part or structure.

According to an advantageous embodiment, the high frequency $f_{sh}$ is a multiple of the low frequency $f_{sl}$.

The high frequency $f_{sh}$ can be comprised between a few kHz and a few hundred kHz depending on the type of vibration or deformation to be measured.

The low frequency $f_{sl}$ can be comprised between 1 Hz and $f_{sh}/10$ which is particularly suitable for measuring temperature variations.

According to a particular embodiment, the high frequency $f_{sh}$ is a multiple of the low frequency $f_{sl}$ which simplifies the calculations.

The frequency analysis may in particular comprise a Fourier transform.

The method may further comprise an optimization algorithm called "fixed point" optimization algorithm.

The method advantageously comprises returning to the time domain via an inverse Fourier transform to obtain the estimated source(s).

The present application also relates to a computer program comprising instructions for implementing the method of the application according to one when this program is executed by a processor and a computer-readable non-transitory recording medium on which is recorded a program for implementing the method of the application when this program is executed by a processor.

BRIEF DESCRIPTION OF THE DRAWINGS

Other features, details and advantages of the invention will appear upon reading the detailed description below, and upon analyzing the appended drawings, wherein.

DESCRIPTION OF EMBODIMENTS

The drawings and the description below contain, for the most part, certain elements. They may therefore not only be used to better understand the present invention, but also contribute to its definition, if necessary.

Figure 1:
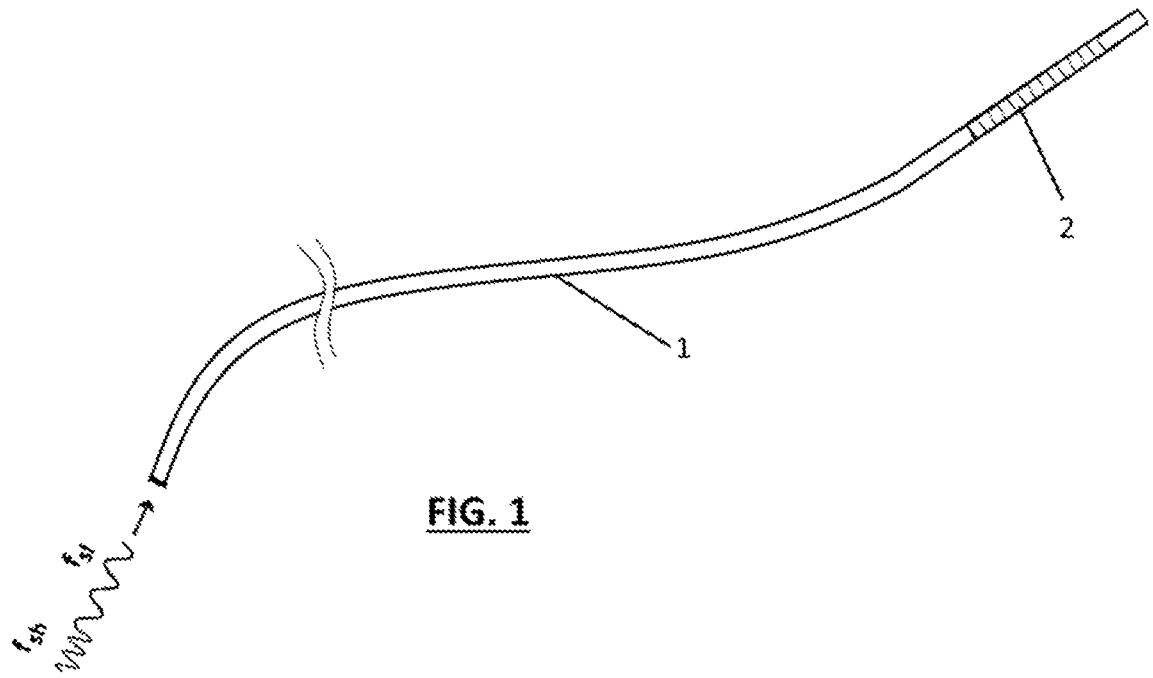
FIG. 1 schematically represents an optical fiber provided with a Bragg grating.

FIG. 1 schematically represents an optical fiber 1 provided with a Bragg grating 2.

When a Bragg grating (Fiber Bragg Grating-FBS) is inscribed on an optical line (FO), bonded to a structural area/part, it allows both to sense the stresses of the temperature (environmental condition) and deformation (operational condition). However, it is not possible to discriminate the influence of temperature from the influence of deformation without additional measurement.

In the prior art, in order to discriminate/measure the contributions of said physical quantities, it turns out to be necessary to have two FO lines bonded to the same structural area/part, each having a Bragg grating spatially close to each other so that this proximity would allow the two Bragg gratings to experience the same temperature variation and the same deformation:

That is to say:

Two FO lines bonded to a structural area, each having an inscribed Bragg grating, $\lambda_{B_1}$, $\lambda_{B_2}$, the wavelengths characteristic of said Bragg gratings.

When the structural area/part is simultaneously subjected to a variation in temperature (environmental condition), in the stress state and vibrations (operational condition), the opto-thermomechanical interaction is written as follows:

$$\begin{cases} \Delta\lambda_{B_1} = K_{\varepsilon_1}\varepsilon + K_{T1}\Delta T \\ \Delta\lambda_{B_2} = K_{\varepsilon_2}\varepsilon + K_{T2}\Delta T \end{cases} \quad [\text{Math. 1}]$$

$$\begin{cases} K_{\varepsilon_1} = (1-\rho)\lambda_{B_1}, K_{T_1} = (\alpha+\eta)\lambda_{B_1} \\ K_{\varepsilon_2} = (1-\rho)\lambda_{B_2}, K_{T_1} = (\alpha+\eta)\lambda_{B_2} \end{cases} \quad [\text{Math. 2}]$$

where:

$\Delta\lambda_{B_1}$, $\Delta\lambda_{B_2}$ represent the variation of the wavelength of the two Bragg gratings $\lambda_{B_1}$, $\lambda_{B_2}$, due to environmental and operational conditions, $\varepsilon E$, $\Delta T$ represent respectively the deformation (relative elongation) and the temperature variation, $\alpha$, $\eta$ and $\rho$ are respectively the coefficients of thermal expansion, thermo-optics, and photoelasticity, intrinsic to the fiber, $\{K_{\varepsilon_1}, K_{\varepsilon_2}\}$ are the deformation sensitivity parameters of the two Bragg gratings, $\{K_{T1}, K_{T2}\}$ are the temperature sensitivity parameters of the two Bragg gratings.

In matrix form, equation (1) is written as follows:

$$\begin{bmatrix} \Delta\lambda_{B_1} \\ \Delta\lambda_{B_2} \end{bmatrix} = \underbrace{\begin{bmatrix} K_{\varepsilon_1} & K_{T1} \\ K_{\varepsilon_2} & K_{T2} \end{bmatrix}}_{T}\begin{bmatrix} \varepsilon \\ \Delta T \end{bmatrix} \quad [\text{Math. 3}]$$

where the matrix T is called "wavelength shift matrix"

Knowing the measurement emanating from the 2 Bragg gratings, that is to say $\Delta\lambda_{B_1}$, $\Delta\lambda_{B_2}$, and the sensitivity parameters $\{K_{\varepsilon_1}, K_{\varepsilon_2}, K_{T1}, K_{T2}\}$, the physical quantities $\varepsilon$ and $\Delta T$ can be calculated by inverting the matrix T:

$$\begin{bmatrix} \varepsilon \\ \Delta T \end{bmatrix} = \frac{1}{K_{\varepsilon_1}K_{T2} - K_{T1}K_{\varepsilon_2}}\begin{bmatrix} K_{T2} & K_{T1} \\ -K_{\varepsilon_2} & K_{\varepsilon_1} \end{bmatrix}\begin{bmatrix} \Delta\lambda_{B_1} \\ \Delta\lambda_{B_2} \end{bmatrix} \quad [\text{Math. 4}]$$

However, when the two Bragg gratings are spatially close to each other, the deformation and temperature sensitivity parameters are nearly equal: $K_{\varepsilon_1} \approx K_{\varepsilon_2}$ and $K_{T1} \approx K_{T2}$. This would lead to a non-solution of equation (4).

This leads to having to separate the gratings or to make one of the fibers and its grating insensitive to one of the parameters to be measured, which further complicates the positioning of the fibers.

The purpose of this application is to overcome such complexity.

For this purpose, the present application proposes to simultaneously measure the temperature and the deformation of a structural area/part on the basis of a single line of optical fiber having a single Bragg grating.

The invention firstly uses a data acquisition measurement block (optronic interrogator). During this acquisition, the interrogator measures the wavelength associated with the light reflected by the optical fiber through the Bragg gratings and converts it into an engineering unit (for example in Volt) so that it can be exploited by a processing unit. Said block is interrogated successively according to two sampling frequencies: one being a low frequency (denoted $f_{sl}$) and the other being a high frequency (denoted $f_{sh}$), as represented in FIG. 1.

According to the invention, the low frequency $f_{sl}$ is suitable for sensing a slow rate of change which will highlight the temperature variation which is a datum varying relatively slowly compared to the mechanical vibrations while the high frequency $f_{sh}$ is suitable for sensing a faster rate of change highlighting the vibrations and therefore the deformation. It should also be noted that $f_{sh}$ is a multiple of $f_{sl}$ in order to have the same number of time samples by also varying the acquisition durations. This approach would avoid calculation errors in the portion related to the multivariate analysis. As an indication, $f_{sh}$ can be comprised between a few kHz and a few hundred kHz. As for $f_{sl}$, it can be comprised between 1 Hz and $f_{sh}/10$. The choice of these frequencies can depend on the chosen application and on the difference in rate of change between the temperature variation and the vibratory frequency, the frequencies being chosen to be at least twice the maximum variation frequency to be measured.

The invention secondly uses an algorithmic block based on a blind-source-separation (BSS) technique, the tools of which use a frequency analysis, a multivariate analysis and higher-order statistics in order to take advantage of the assumption of statistical independence associated with the physical information of temperature and deformation.

Higher-Order Statistics (HOS) relate to moments and cumulants of order greater than 2. They are used in addition to second order statistics and give a more complete description of the data and their properties.

The purpose of the combination of these blocks is to separate the measurement of temperature variation and the measurement of deformation to discriminate the effect of temperature from the effect of vibration.

Using the matrix equation defined previously:

$$\begin{bmatrix} \Delta\lambda_{B_1} \\ \Delta\lambda_{B_2} \end{bmatrix} = \underbrace{\begin{bmatrix} K_{\varepsilon_1} & K_{T1} \\ K_{\varepsilon_2} & K_{T2} \end{bmatrix}}_{M} \begin{bmatrix} \varepsilon \\ \Delta T \end{bmatrix} \quad \text{[Math. 5]}$$

From an advanced signal processing point of view, the model defined in equation (5) is a blind-source-separation problem.

Figure 2:
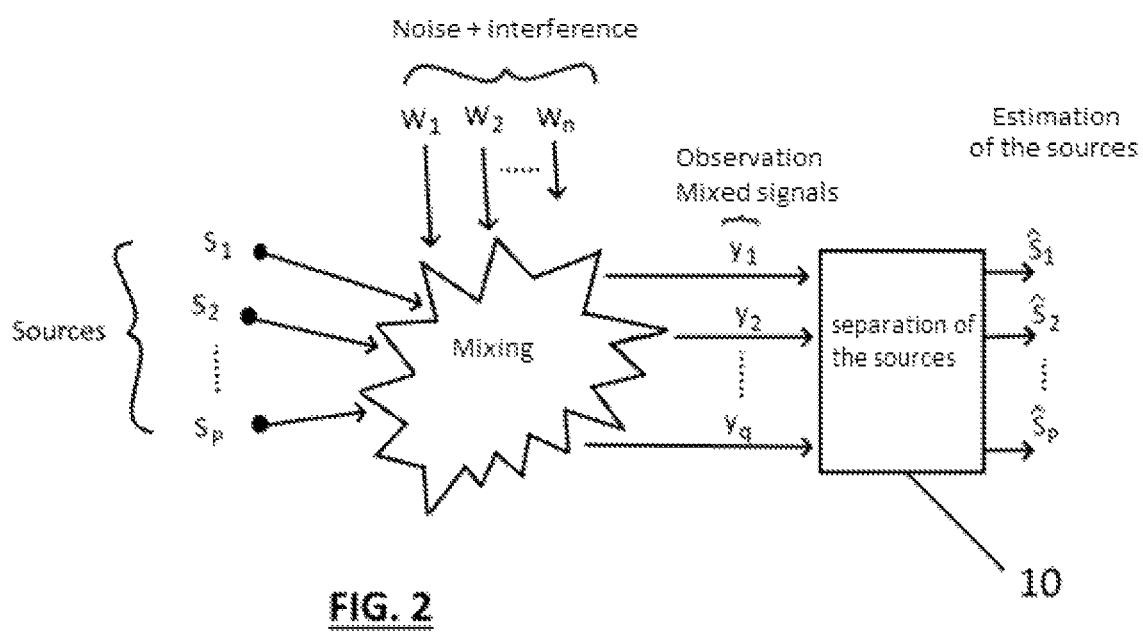
FIG. 2 schematically shows a problem of blind separation of sources.
Figure 3:
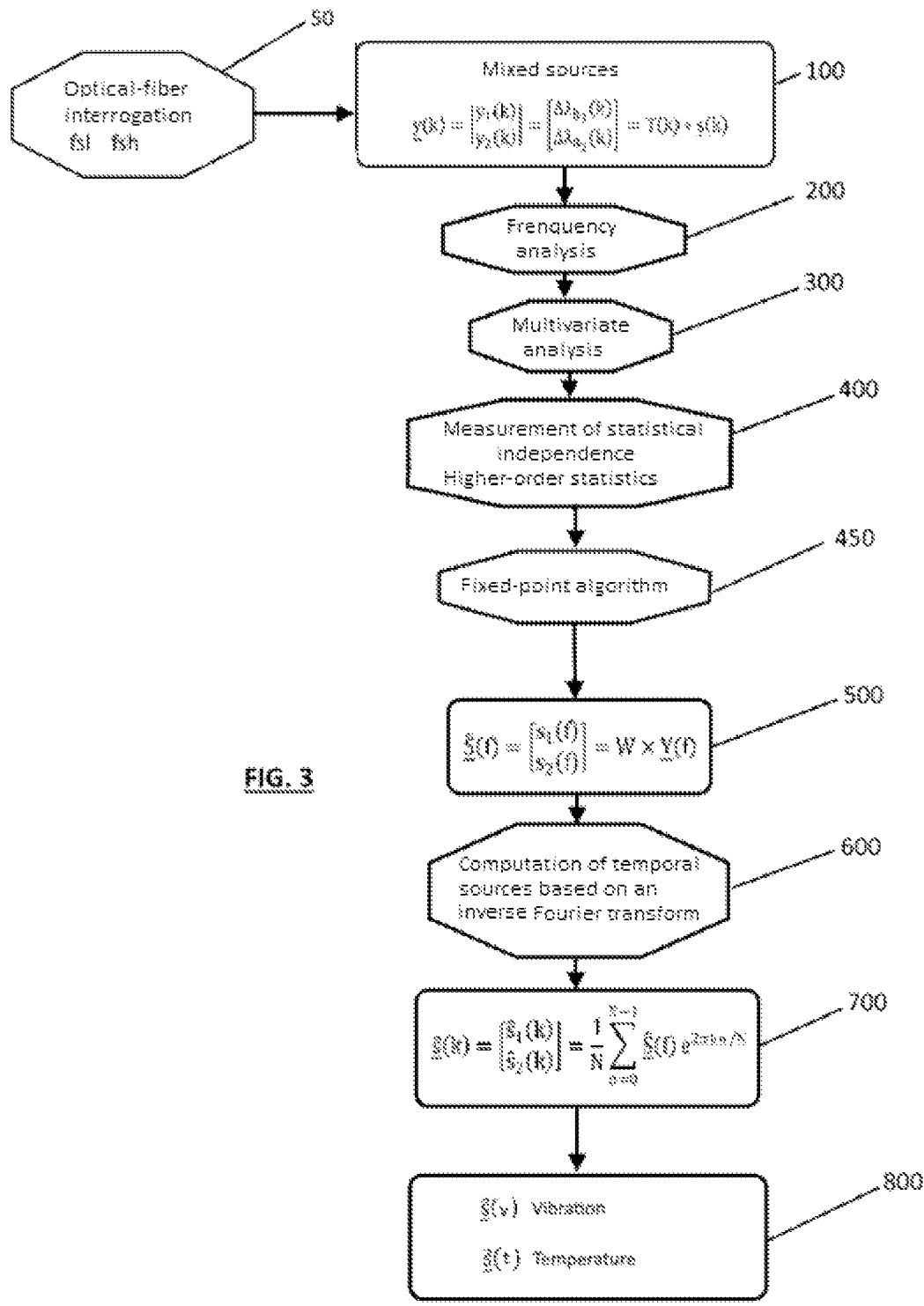
FIG. 3 schematically shows the steps of the method of the present application.

The scientific problem of source separation consists in extracting a set of unobservable signals, called "source signals", from a set of observable signals as shown schematically in FIG. 2 where the source signals $S_1, S_2, \ldots, S_p$ are mixed with noise or interference $W_1, W_2, \ldots, W_n$ to give mixed signals $Y_1, Y_2, \ldots Y_n$ which have to be processed by a source separation module 10 to obtain estimated sources $\hat{S}_1, \hat{S}_2, \ldots \hat{S}_p$. These observations come from sensors, for example: microphones, antennas, cameras, piezoelectric transducers, etc. . . . . In the context of the present application, the source signals represent the variation in temperature and the deformation of the structural area/part and the observable signals emanate from a single Bragg grating inscribed on an FO line, interrogated successively with a low and high sampling frequency possibly with the same number of time samples. Taking into account the discrete time k and the transfer function of the medium, the model defined in equation (5) is a mixture model, and is expressed according to the following convolution model:

$$\underline{y}(k) = T(k) * \underline{s}(k) \quad \text{[Math. 6]}$$

where, as shown in FIG. 3:

$$\underline{y}(k) = \begin{bmatrix} y_1(k) \\ y_2(k) \end{bmatrix} = \begin{bmatrix} \Delta\lambda_{B_1}(k) \\ \Delta\lambda_{B_2}(k) \end{bmatrix} \quad \text{[Math. 6]}$$

is the vector 100 of measurements observable at instant k emanating from the Bragg grating, the interrogation of which was carried out according to two sampling frequencies: low $f_{sl}$ and high $f_{sh}$, $$\underline{s}(k) = \begin{bmatrix} s_1(k) \\ s_2(k) \end{bmatrix}$$

is the vector of sources at instant k, reflecting the measurement emanating from the temperature variation and the deformation.

T(k) is the mixing matrix reflecting the impulse response of the medium, i.e. transfer function of the structural part to be monitored.

In order to solve the separation problem: estimate the vector of sources $\underline{s}$ knowing only the vector of measurements $\underline{y}$, the following steps shown in FIG. 3 which represents an example of a method of the application from mixed sources 100 are defined.

The different steps needed to solve the source separation problem are:

(i) switching the measured signals from the time domain to the frequency domain;
(ii) using a Higher-Order Statistic tool in order to take advantage of the independence of the sources and pose the objective function and an optimization algorithm based on the "fixed point" in order to find a mixing matrix allowing the 2 source signals to be separated in the frequency domain;
(iii) switching the source signals in the time domain via the inverse Fourier transform to obtain the estimated sources $\hat{\underline{s}}(k)$.

Step No 1: Switching to the frequency domain in order to transform the convolution product into a multiplication by a Fourier transform 200:

$$\underline{Y}(f) = T \times \underline{S}(f) \quad \text{[Math. 8]}$$

where:
$\underline{Y}(f) \in \mathbb{C}$ the Fourier transform of the measurement vector (complex vector),
$\underline{S}(f) \in \mathbb{C}$ is the Fourier transform of the vector of sources that is to be determined,
T is the mixing matrix.

Step No 2:
Use of the following tools according to three sub-steps:
Linear Algebra 300 applied to complex numbers,
Higher-Order Statistics in order to implement the assumption of statistical independence of the sources 400,
optimization algorithm called "fixed point" optimization algorithm 450 to find the separation matrix (denoted W).

These sub-steps allow to estimate the vector of sources in the frequency domain (denoted $\underline{S}(f)$) 500:

$$\hat{\underline{S}}(f) = \begin{bmatrix} s_1(f) \\ s_2(f) \end{bmatrix} = W \times \underline{Y}(f) \quad \text{[Math. 9]}$$

Using the mixing model in the frequency domain:

$$\underline{Y}(f) = T \times \underline{S}(f) \quad \text{[Math. 11]}$$

The separation model is defined by:

$$\underline{S}(f) = W \underline{Y}(f) \quad \text{[Math. 12]}$$

where W is the separation matrix.

An objective function denoted $J_G(w)$ based on Higher-Order Statistics is defined:

$$J_G(w) = E\{G(|w^H \underline{y}|^2)\} \quad \text{[Math. 13]}$$

where:
E is the mathematical expectation operator.
Find the matrix W by maximizing the objective function:
maximizes $\Sigma_{j=1}^n J_G(w_j)$ with respect to $w_j$
under stress $E\{(w_k^H x)(w_j^H x)^*\} = \delta_{jk}$
where:

$$\delta_{jk} = \begin{cases} 1 & \text{for } j = k \\ 0 & \text{for } j \neq k \end{cases} \quad \text{[Math. 14]}$$

Step No 3:
Switching in the time domain via the inverse Fourier transform 600 to obtain the estimated sources $\hat{\underline{s}}(k)$ 700:

$$\hat{\underline{s}}(k) = \begin{bmatrix} \hat{s}_1(k) \\ \hat{s}_2(k) \end{bmatrix} = \frac{1}{N} \sum_{n=0}^{N-1} \hat{\underline{S}}(f) e^{2\pi k n / N} \quad \text{[Math. 14]}$$

where:

N is the number of frequency points used in the calculation of the inverse Fourier transform: $N=T \times f_{sh}$, with T representing the acquisition time.

n is the frequency index

Thus, this allows to find the estimates 800 of the deformation $\hat{\underline{s}}(v)$ and of the temperature $\hat{\underline{s}}(t)$ with the corresponding frequency indices.

INDUSTRIAL APPLICATION

The invention can be applied in particular to the monitoring of parts or structures of aircraft, space launchers or other systems where the temperature and vibrations have an influence on the operation of the systems.

The invention claimed is:

1. A method for measuring temperature and deformation of a part or structure on the basis of a single line of optical fiber having a single Bragg grating, the method comprising:
   interrogating the optical fiber based on two sampling frequencies; one being a low frequency and the other being a high frequency, the low frequency being suitable for sensing a slow rate of change corresponding to the temperature variation, and the high frequency being suitable for sensing a fast rate of change corresponding to vibrations;
   implementing an algorithmic block based on a blind-source-separation (BSS) technique, comprising a frequency analysis, a multivariate analysis, and higher-order statistics; and
   returning to the time domain via an inverse Fourier transform.

2. The method of claim 1, for which the high frequency is a multiple of the low frequency.

3. The method of claim 1, wherein the high frequency is comprised between a few kHz and a few hundred kHz.

4. The method of claim 1, wherein the low frequency is comprised between 1 Hz and 10% of the high frequency.

5. The method of claim 1, wherein the frequency analysis comprises a Fourier transform.

6. The method of claim 1, wherein the blind-source-separation (BSS) technique further comprises an optimization algorithm called "fixed point" optimization algorithm.

7. A computer program comprising instructions for implementing the method of claim 1 when this program is executed by a processor.

8. A computer-readable non-transitory recording medium on which is recorded a program for implementing the method of claim 1 when the program is executed by a processor.

* * * * *